United States Patent
Furukawa et al.

(10) Patent No.: US 10,406,948 B2
(45) Date of Patent: Sep. 10, 2019

(54) VEHICLE SEAT

(71) Applicant: TOYOTA BOSHOKU KABUSHIKI KAISHA, Aichi (JP)

(72) Inventors: Kenji Furukawa, Aichi (JP); Teruyuki Shimizu, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 44 days.

(21) Appl. No.: 15/936,839

(22) Filed: Mar. 27, 2018

(65) Prior Publication Data

US 2018/0281634 A1    Oct. 4, 2018

(30) Foreign Application Priority Data

Apr. 3, 2017   (JP) .................. 2017-073625

(51) Int. Cl.
   *B60N 2/30*   (2006.01)
   *B60N 2/16*   (2006.01)
   *B60N 2/20*   (2006.01)

(52) U.S. Cl.
   CPC .......... *B60N 2/309* (2013.01); *B60N 2/1615* (2013.01); *B60N 2/20* (2013.01); *B60N 2/3011* (2013.01); *B60N 2/3031* (2013.01); *B60N 2/3065* (2013.01)

(58) Field of Classification Search
   CPC ........ B60N 2/309; B60N 2/1615; B60N 2/20; B60N 2/3011; B60N 2/3065; B60N 2/3031

USPC ....................................... 296/65.09
   See application file for complete search history.

(56) References Cited

U.S. PATENT DOCUMENTS

| | | | |
|---|---|---|---|
| 2007/0284922 A1* | 12/2007 | Matsuhashi | B60N 2/1615 297/216.2 |
| 2011/0074199 A1 | 3/2011 | Sprenger et al. | |
| 2014/0238188 A1* | 8/2014 | Ito | B60N 2/0228 74/664 |
| 2018/0334057 A1* | 11/2018 | Nagatani | B60N 2/045 |

FOREIGN PATENT DOCUMENTS

JP   2009-523090   6/2009

* cited by examiner

*Primary Examiner* — Pinel E Romain
(74) *Attorney, Agent, or Firm* — Greenblum & Bernstein, P.L.C.

(57) ABSTRACT

Provided is a vehicle seat for installation in a vehicle. The vehicle seat comprises a side frame, a rod, a first lifter link that comprises an upper end pivotably coupled to the side frame through the rod and a lower end pivotably coupled to the vehicle, a second lifter link that is provided in a position shifted in a seat front-rear direction relative to the first lifter link and comprises an upper end pivotably coupled to the side frame and a lower end pivotably coupled to the vehicle, and a restriction member configured to restrict downward displacement of the rod below a specified position.

19 Claims, 8 Drawing Sheets

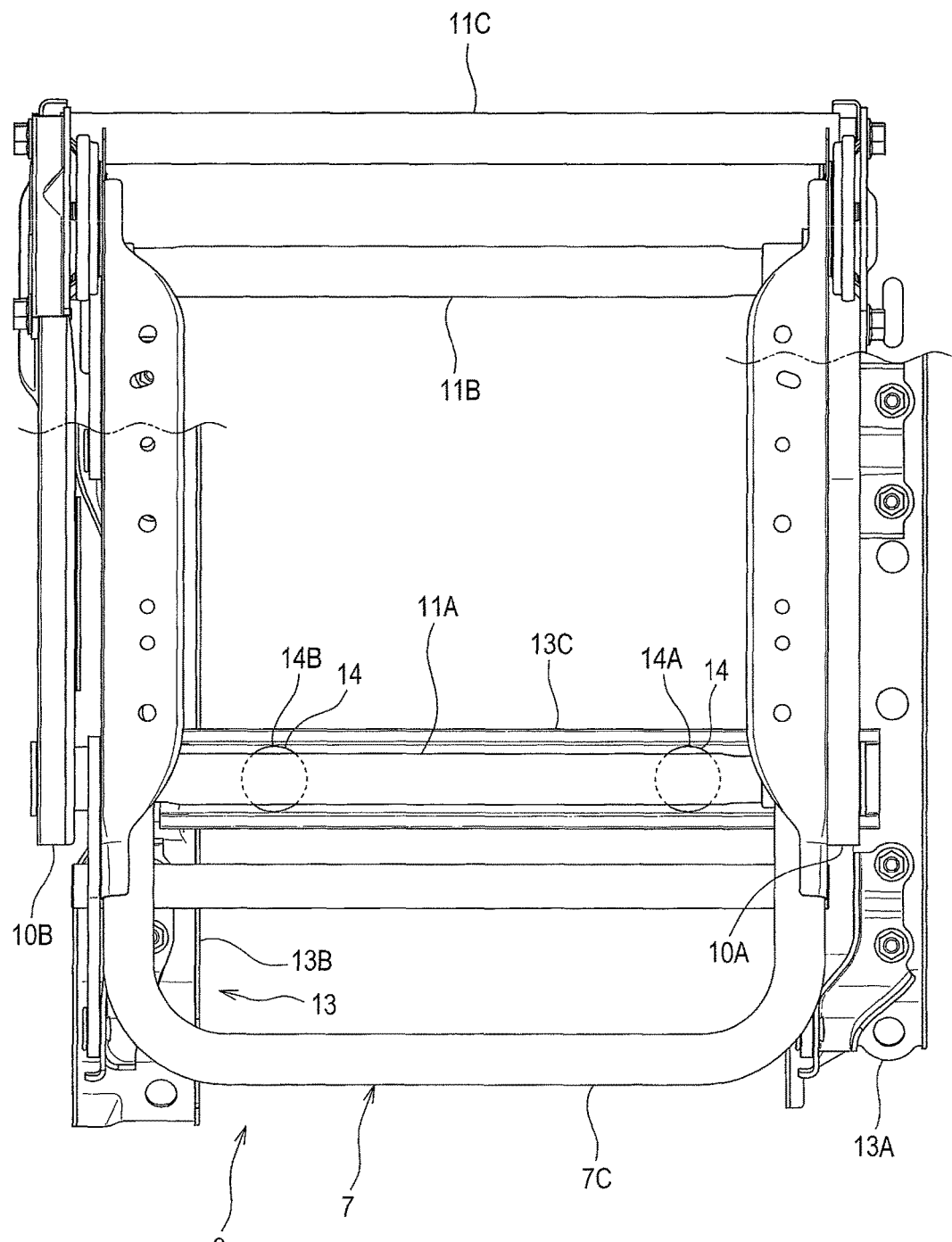
FIG. 7
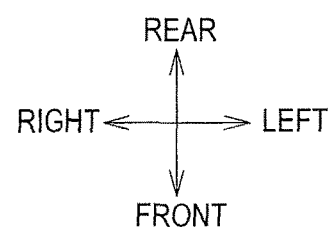

VEHICLE SEAT

CROSS-REFERENCE TO RELATED APPLICATIONS

This application claims the benefit of Japanese Patent Application No. 2017-073625 filed on Apr. 3, 2017 with the Japan Patent Office, the entire disclosure of which is incorporated herein by reference.

BACKGROUND

The present disclosure relates to a vehicle seat for installation in a vehicle.

In a vehicle seat described, for example, in Japanese Translation of PCT International Application Publication No. 2009-523090, a four-bar linkage mechanism is configured with a side frame of a cushion frame and a plurality of lifter links. Specifically, each of the lifter links has an upper end pivotally coupled to the side frame and a lower end pivotally coupled to a vehicle. Thus, pivotal displacement of each of the lifter links leads to raising or lowering, or displacement in a seat front-rear direction, of the side frame and thus the cushion frame.

SUMMARY

When any one of the lifter links pivots to lie in a substantially horizontal position (also known as a lying state or a stored state), thereby lowering the cushion frame, occurrence of a state (a) or a state (b) below may cause a defect of "failing to return the cushion frame to its initial position."

(a) A state where any one of the lifter links and the side frame are aligned on a coaxial line. In other words, a first joint (with a first center) joins the front-left first lifter link with a front end of a left base member, a second joint (with a second center, also knows as a center point of coupling) joins the front-left first lifter link with the left side frame, a third joint (with a third center) joins the left side frame with the rear-left second lifter link, and a fourth joint (with a fourth center) joins the rear-left second lifter link with a rear end of the left base member. A first line is defined by the first center and the second center. A second line is defined by the second center and the third center. Thus, "aligned on a coaxial line" is defined as the first line being coaxial with the second line, such that the coaxial line stretches from the first center to the third center, and the coaxial line intersects the second center. Similarly, the right side of the seat may form an additional coaxial line. State (a) occurs when one or both sides of the seat form this geometry. This state (a) is called a "coaxial" state.

(b) A state where a center point of coupling between any one of the lifter links and the side frame is positioned below the aforementioned straight line. In other words, a state where the second center is positioned below the aforementioned coaxial line. The right side of the seat may form a similar geometry. State (b) occurs when one or both sides of the seat form this geometry. This state (b) is called a "below coaxial" state.

In one aspect of the present disclosure, it is preferable to provide a vehicle seat that enables reduction in occurrence of the aforementioned defect.

A vehicle seat of the present disclosure comprises a rod extending in a seat-width direction and comprising one end coupled to a side frame, a first lifter link comprising an upper end pivotably coupled to the side frame through the rod and a lower end pivotably coupled to the vehicle, a second lifter link provided in a position shifted in a seat front-rear direction relative to the first lifter link and comprising an upper end pivotably coupled to the side frame and a lower end pivotably coupled to the vehicle, and a restriction member configured to restrict downward displacement of the rod below a specified position, the restriction member, when projected on a virtual plane perpendicular to the rod, being arranged to be direct under the rod that is projected on the virtual plan.

This may enable reduction in occurrence of the state (a) where the first lifter link and the side frame are aligned on a straight line and the state (b) where the center point of coupling between the first lifter link and the side frame is positioned below the aforementioned straight line. Accordingly, occurrence of the aforementioned defect may be reduced.

Also, the rod and the restriction member are configured to be contactable with each other vertically, the rod and the restriction member may be surely brought into contact with each other even with dimensional variations of components.

The second lifter link may be configured in a similar manner as the first lifter link, that is, configured to be coupled to the side frame indirectly through a second rod, or may be configured to be coupled to the side frame directly not through a second rod.

The present disclosure may have a configuration below.

The second lifter link may be a driving link that receives a rotational force and is pivotally rotated around the upper end of the second lifter link, and the first lifter link may be a driven link that follows a pivotal displacement of the second lifter link.

With the aforementioned configuration, when a downward load is applied to the side frame, the second lifter link as the driving link is less likely to be displaced downward as compared with the first lifter link as the driven link. As described above, the restriction member is arranged to be direct under the rod to which the first lifter link is coupled.

The restriction member is preferably arranged in a position to be contactable with the rod. Specifically, a configuration is preferable in which, when a downward load acts on the side frame, the restriction member contacts the rod, thereby restricting downward displacement of the aforementioned center point of coupling.

Since "the restriction member is arranged to be direct under the rod that is projected on the virtual plane," the present disclosure may include a configuration in which the side frame and the restriction member contact each other. However, any configuration in which the restriction member contacts the rod may surely restrict a downward displacement of the rod.

At least an upper end of the restriction member preferably comprise a deformable buffer member. This enables reduction in generation of large noise when the restriction member contacts, for example, the rod.

It is preferable that a base be provided to fix the lower end of the first lifter link to a vehicle and that the restriction member be provided to the base. This enables mounting of the restriction member, at the same time that the vehicle seat is mounted to a vehicle. Accordingly, an improved mounting efficiency of the restriction member to a vehicle may be achieved.

Further, it is preferable that the restriction member comprise a first restriction member provided to a first extending end of a bridge portion and a second restriction member provided to a second extending end of the bridge portion.

This may enable a definite reduction in occurrence of the aforementioned defect. The bridge portion is a member to couple two base portions provided on respective sides of the vehicle seat in the seat-width direction.

BRIEF DESCRIPTION OF THE DRAWINGS

An embodiment of the present disclosure will be described hereinafter by way of example with reference to the accompanying drawings, in which:

FIG. 7 is a top view of the cushion frame according to the embodiment of the present disclosure.

DETAILED DESCRIPTION OF THE PREFERRED EMBODIMENTS

Figure 1:
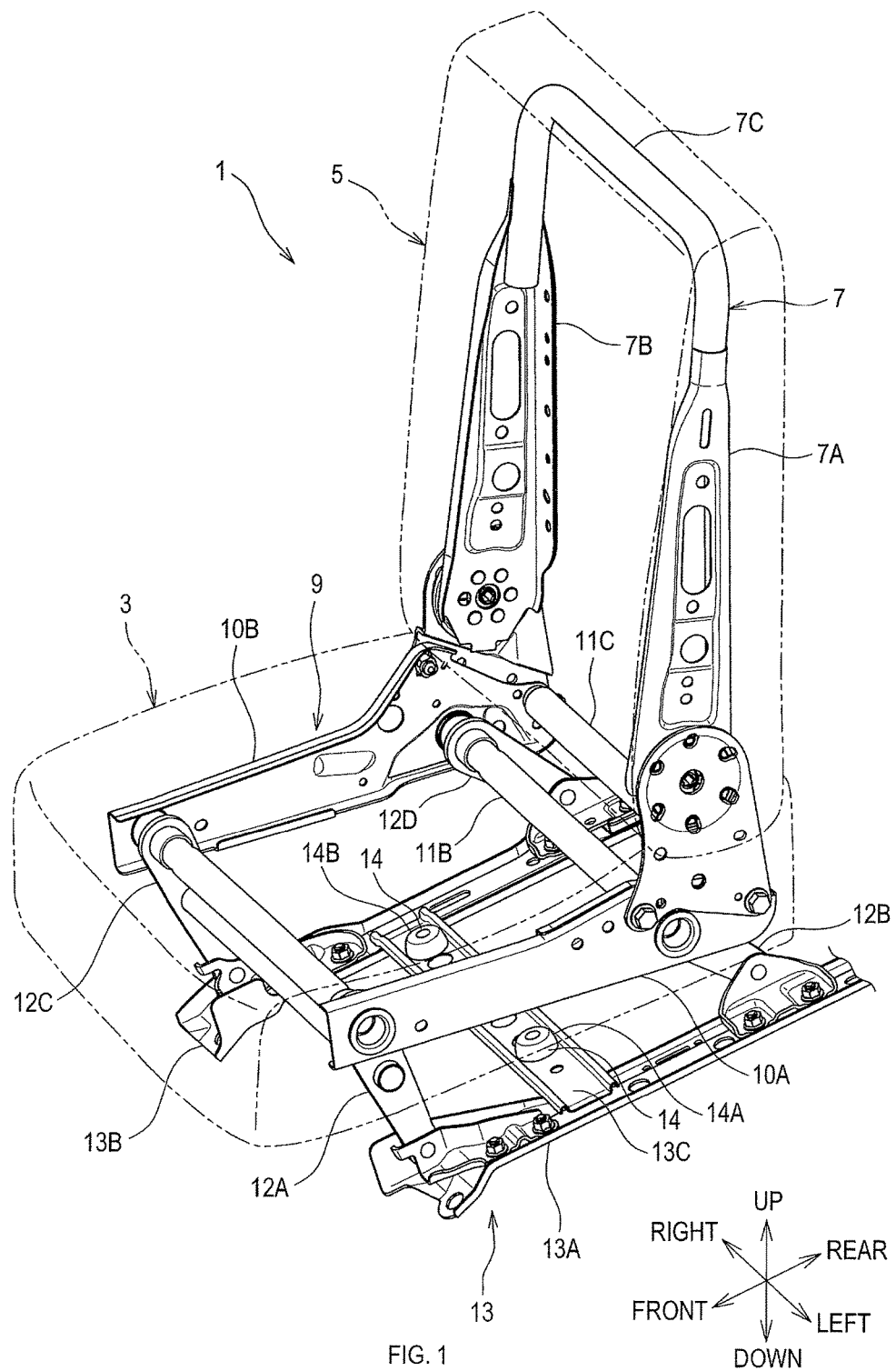
FIG. 1 is a view showing a vehicle seat according to the embodiment of the present disclosure.

An embodiment described hereinafter is one example embodiment within the technical scope of the present disclosure. That is, matters specifying the invention and the like recited in the appended claims are not limited to any specific configuration, structure, or the like described in the embodiment below.

Arrows and other marks indicating directions shown in the figures are provided for the purpose of easy understanding of mutual relationships of the figures. The present disclosure is not limited to the directions shown in the figures.

1. Overview of Vehicle Seat

A vehicle seat 1 of the present embodiment comprises a seat cushion 3 and a seatback 5. The vehicle seat 1 may be a rear seat of a passenger car.

The seatback 5 supports a back of an occupant. A back frame 7 forms a framework of the seatback 5. The back frame 7 comprises a left side frame 7A, a right side frame 7B, and an upper frame 7C.

The left side frame 7A and the right side frame 7B are arranged on opposite sides of the vehicle seat 1 in a seat-width direction and each extends in a substantially vertical direction. The upper frame 7C couples upper ends of the left side frame 7A and the right side frame 7B.

Lower ends of the left side frame 7A and the right side frame 7B (that is, a lower end of the back frame 7) are coupled to a rear end of a cushion frame 9. The back frame 7 is coupled to the cushion frame 9 to be pivotable in a front-rear direction.

2. Configuration of Cushion Frame 2.1 Overview of Cushion Frame

The seat cushion 3 supports a buttock of an occupant. The cushion frame 9 forms a framework of the seat cushion 3. The cushion frame 9 comprises a left side frame 10A, a right side frame 10B, a first connecting rod 11A, a second connecting rod 11B, a third connecting rod 11C, and first lifter links 12A, 12C (front-left first lifter link 12A, and front-right first lifter link 12C) and second lifter links 12B, 12D (rear-left second lifter link 12B, and rear-right second lifter link 12D). The left side frame 10A and the right side frame 10B are arranged on respectively on the left side and the right side of the vehicle seat 1, each extend in the front-rear direction.

Figure 2:
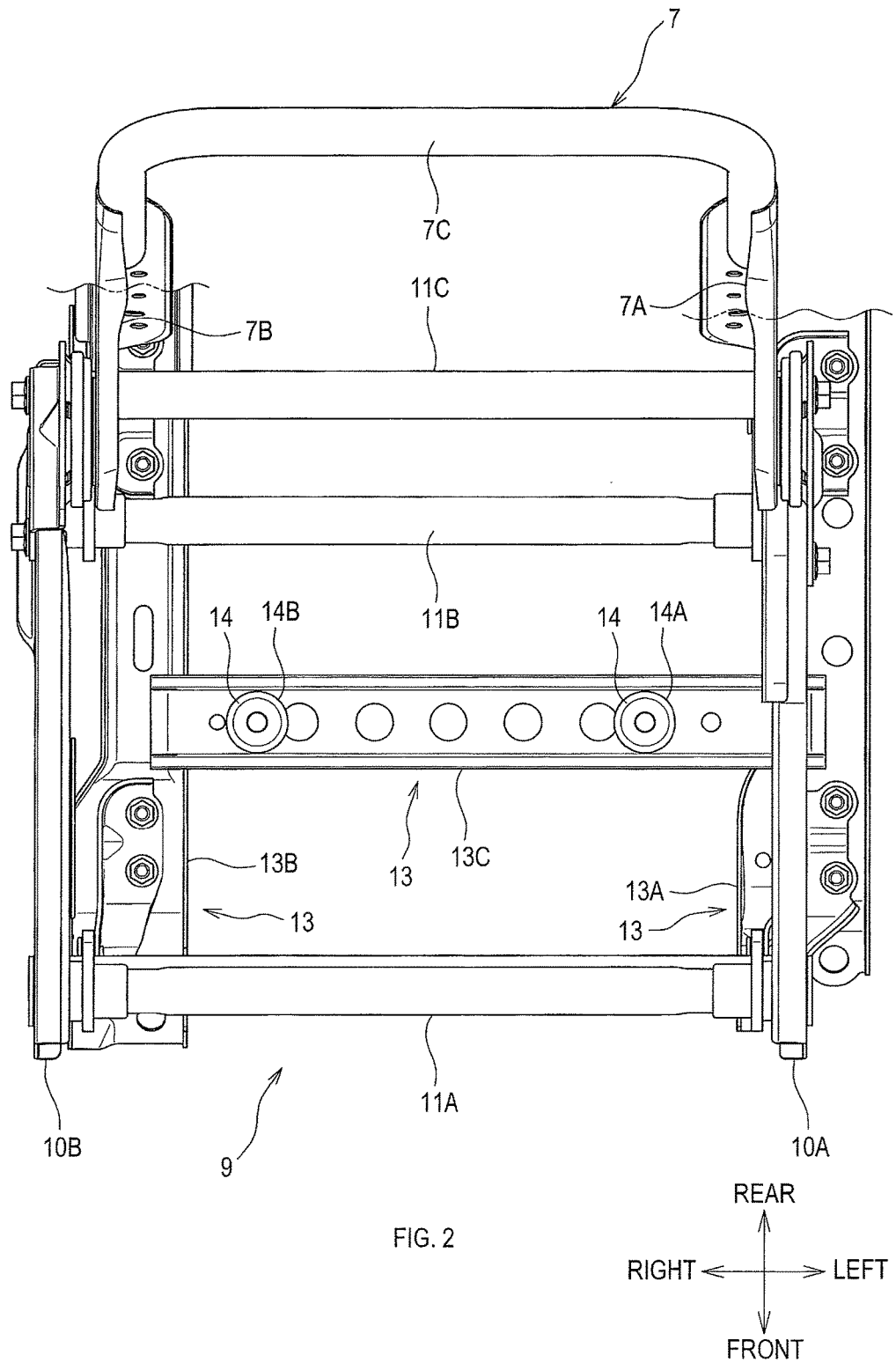
FIG. 2 is a top view of a cushion frame according to the embodiment of the present disclosure.

As shown in FIG. 2, the first to third connecting rods 11A to 11C each extend in the seat-width direction and couple the left side frame 10A and the right side frame 10B. The first connecting rod 11A couples respective seat front end portions of the left side frame 10A and the right side frame 10B.

The third connecting rod 11C couples rear portions of the left side frame 10A and the right side frame 10B. The second connecting rod 11B is located between the first connecting rod 11A and the third connecting rod 11C.

The first connecting rod 11A and the second connecting rod 11B are rotatably coupled to the left side frame 10A and the right side frame 10B. Specifically, the first connecting rod 11A is rotatable around its central axis, and the second connecting rod 11B is rotatable around its central axis.

The third connecting rod 11C is arranged rearward of the second connecting rod 11B. Also, the third connecting rod 11C is fixed to the left side frame 10A and the right side frame 10B, preferably by welding or caulking. The left side frame 10A, the right side frame 10B, and the first to third connecting rods 11A to 11C are preferably made of metal.

As shown in FIG. 1, respective upper ends of the first lifter links 12A, 12C are fixed to the first connecting rod 11A. Respective lower ends of the first lifter links 12A, 12C are pivotably coupled, directly or indirectly, to the vehicle.

The respective upper ends of the first lifter links 12A, 12C are pivotably coupled to the left side frame 10A and the right side frame 10B through the first connecting rod 11A. The upper ends of the first lifter links 12A, 12C are fixed to the first connecting rod 11A, preferably by welding, in a state where the first connecting rod 11A is arranged between the left side frame 10A and the right side frame 10B.

The lower ends of the first lifter links 12A, 12C are coupled to the vehicle through a base 13. As shown in FIG. 2, the base 13 comprises base portions 13A, 13B (left base portion 13A, and right base portion 13B), a bridge portion 13C.

The base portions 13A, 13B are each a strip-shaped member extending in the front-rear direction and are provided on opposite sides of the vehicle seat 1 in the seat-width direction and fixed to a floor panel or the like of the vehicle. Also, the respective lower ends of the first lifter links 12A, 12C are pivotably coupled to the base portions 13A, 13B.

The bridge portion 13C extends in the seat-width direction and bridges the base portions 13A, 13B to couple the base portions 13A, 13B. The bridge portion 13C and each of the base portions 13A, 13B are preferably integrated by welding.

As shown in FIG. 1, respective upper ends of the second lifter links 12B, 12D are fixed to the second connecting rod 11B. Respective lower ends of the second lifter links 12B, 12D are pivotably coupled to the vehicle.

The second lifter links 12B, 12D are coupled to the left side frame 10A, the right side frame 10B, and the vehicle in a same manner as the first lifter link 12A. The respective upper ends of the second lifter links 12B, 12D are pivotably coupled to the left side frame 10A and the right side frame 10B through the second connecting rod 11B. The respective lower ends of the second lifter links 12B, 12D are pivotably coupled to the base portions 13A, 13B.

Figure 3:
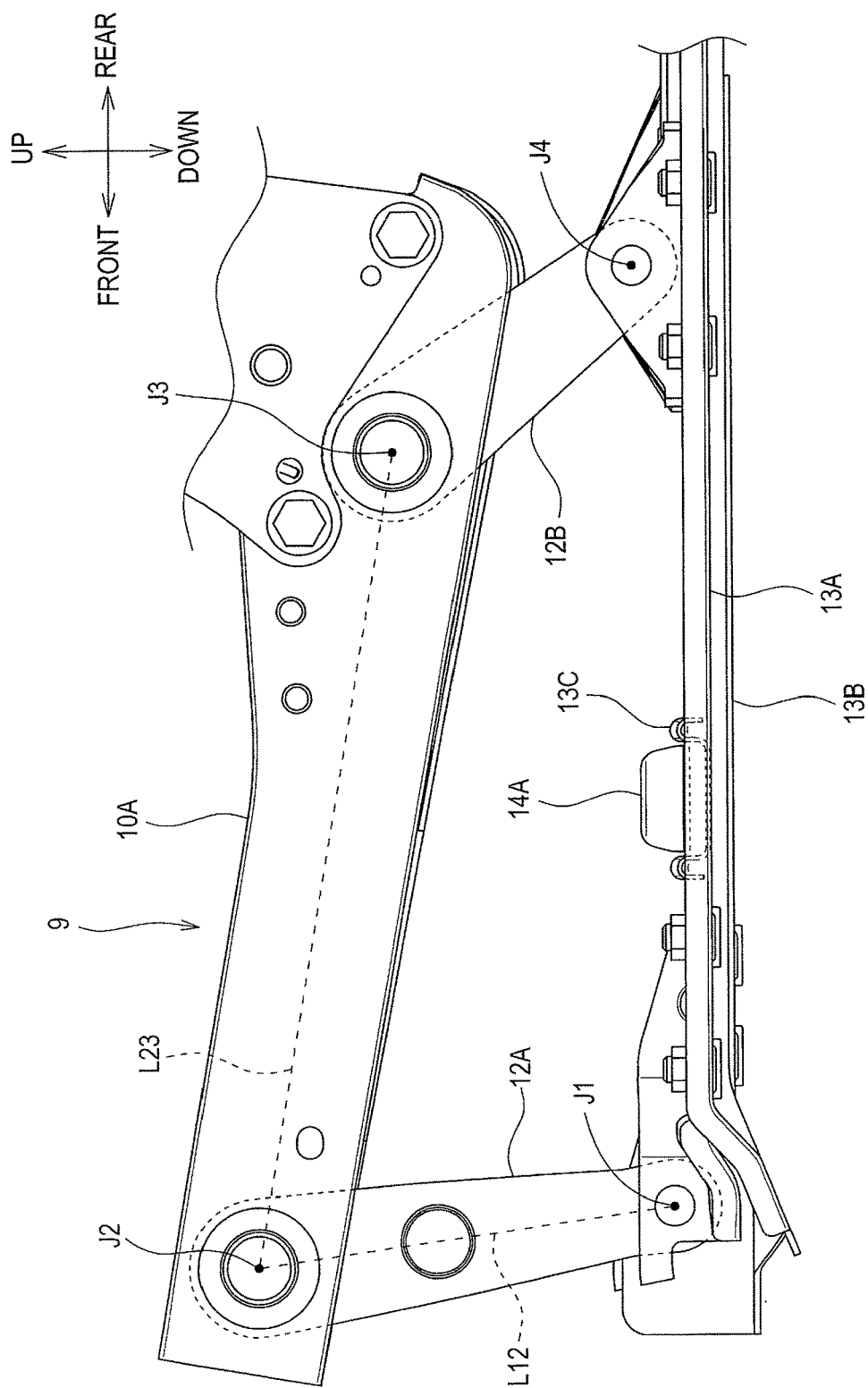
FIG. 3 is a left side view of the cushion frame according to the embodiment of the present disclosure.

As shown in FIG. 3, the left side frame 10A, the first lifter link 12A, and the second lifter link 12B form a four-bar linkage mechanism (a four-joint linkage mechanism) to raise and lower the cushion frame 9, in other words, the vehicle seat 1 with a displacement in the seat front-rear direction.

In a similar manner, the right side frame 10B, the first lifter link 12C, and the second lifter link 12D also form a four-bar linkage mechanism to raise and lower the vehicle seat 1 with a displacement in the seat front-rear direction.

Specifically, as shown in FIG. 3, when the lifter links 12A to 12D are in a standing state in which the upper ends of the lifter links 12A to 12D are positioned at a seat front side (forward) relative to the lower ends of the lifter links 12A to 12D, a front end of the cushion frame 9 is positioned above a rear end of the cushion frame 9, and the cushion frame 9 is spaced above from the base portions 13A, 13B.

Figure 4:
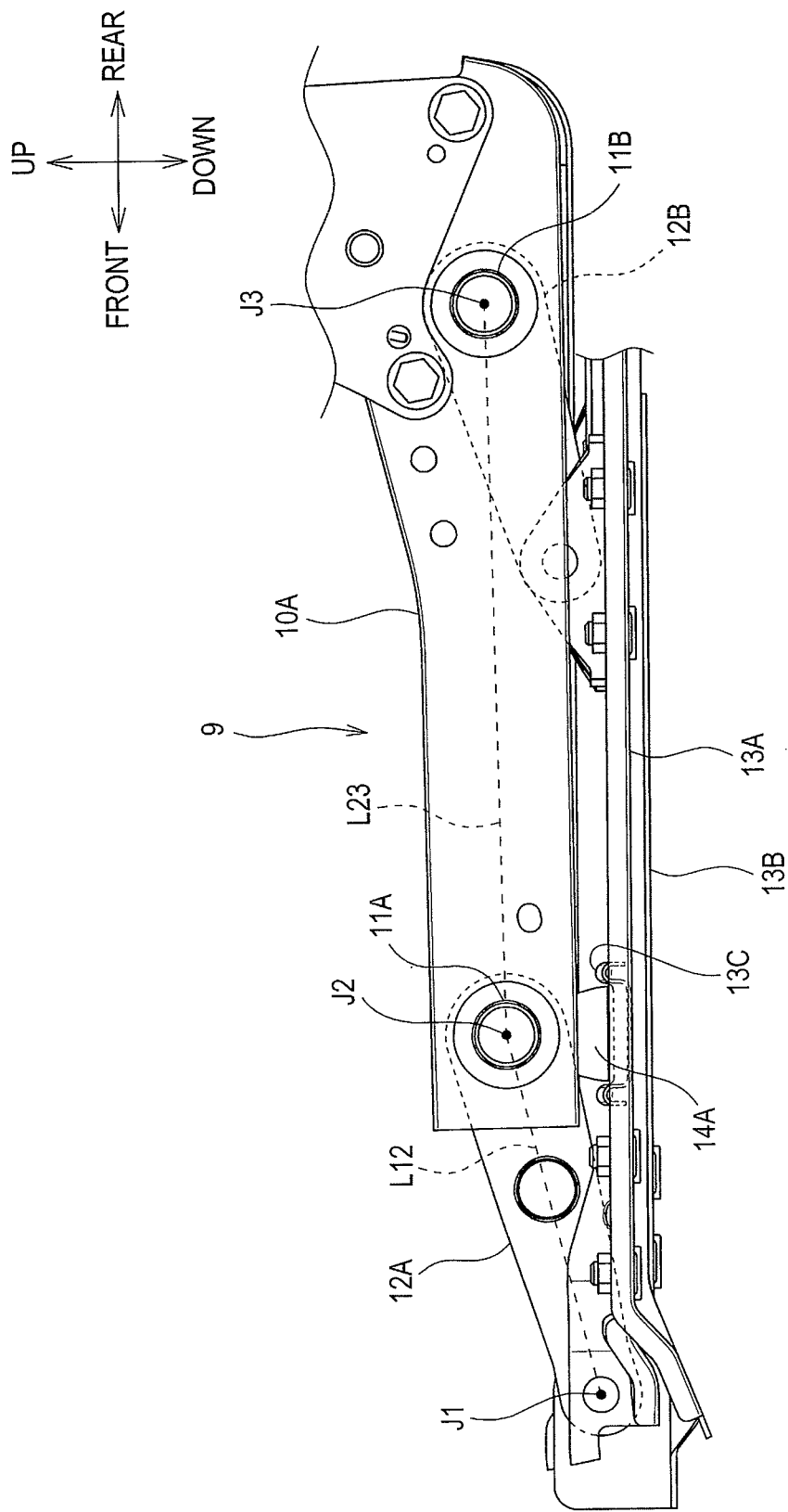
FIG. 4 is a left side view of the cushion frame according to the embodiment of the present disclosure.

As shown in FIG. 4, when the lifter links 12A to 12D are in a lying state (leaning rearward and substantially horizontal, also known as a normal stored state), the cushion frame 9 is positioned close to the base portions 13A, 13B, and the cushion frame 9 is substantially horizontal. Specifically, a first joint (with a first center J1) joins the front-left first lifter link 12A with a front end of a left base member 13A, a second joint (with a second center J2, also knows as a center point of coupling) joins the front-left first lifter 12A with the left side frame 10A, a third joint (with a third center J3) joins the left side frame 10A with the rear-left second lifter link 12B, and a fourth joint (with a fourth center J4) joins the rear-left second lifter link 12B with a rear end of the left base member 13A. A first line L1 is defined by the first center J1 and the second center J2. A second line L2 is defined by the second center J2 and the third center J3. FIG. 4 corresponds to state (c) in FIG. 8, and is called a normal stored state.

Figure 5:
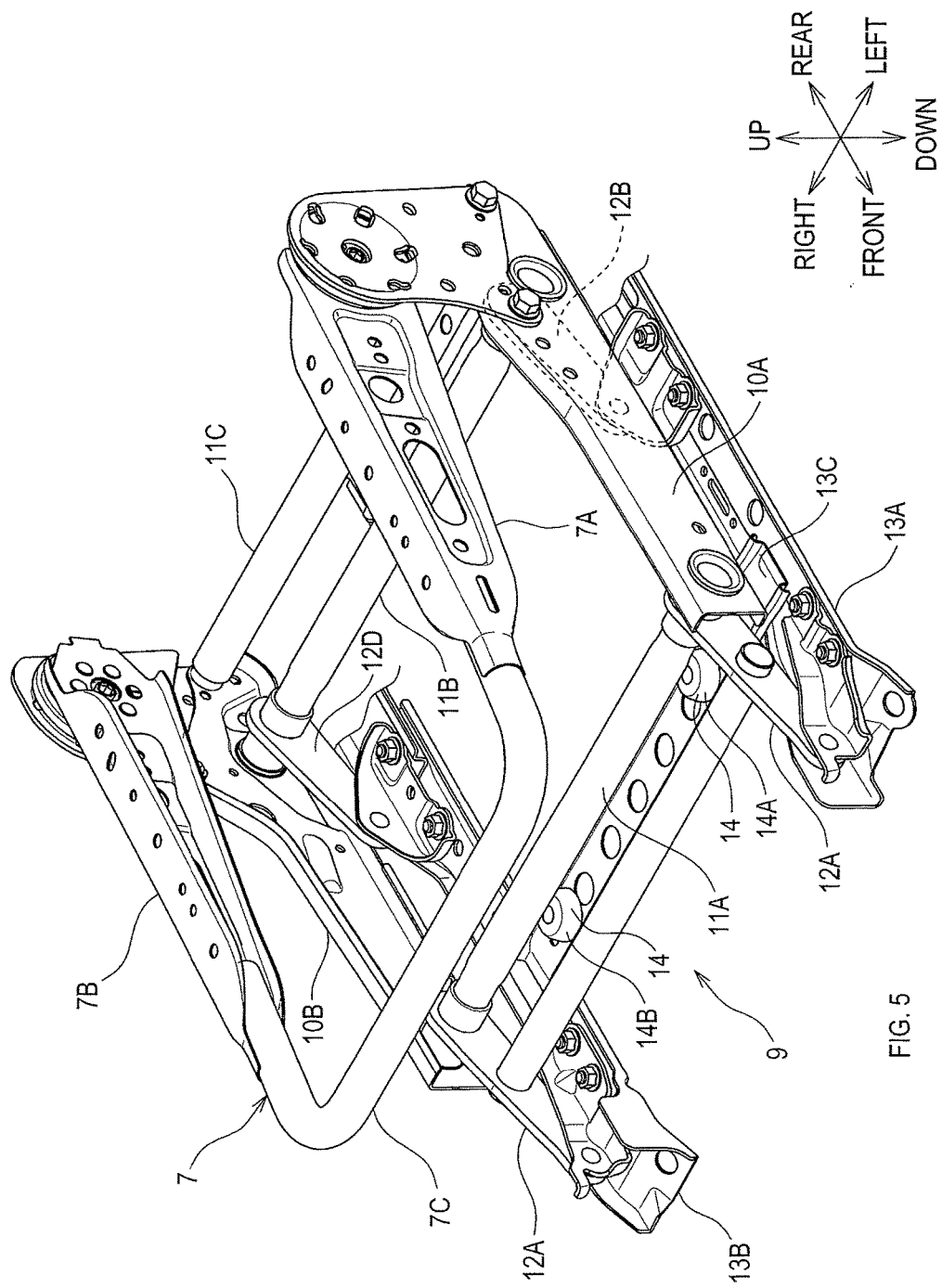
FIG. 5 is a view showing a stored state of a vehicle seat according to the embodiment of the present disclosure.

In a state shown in FIG. 4, the seatback 5 is folded down in a seat front direction (not shown) in conjunction with pivotal movement of the lifter links 12A to 12D, and thereby the vehicle seat 1 is brought into a stored state in the vehicle (also see FIG. 5). This is called state (c), a normal stored state, see FIG. 8.

The first lifter links 12A, 12C have lengths greater than lengths of the second lifter links 12B, 12D, and the lifter links 12A to 12D are displaced from the standing state to the lying state as a result of a rearward displacement of the upper ends of the lifter links 12A to 12D.

The second lifter links 12B, 12D function as driving links that receive a rotational force (from a driving mechanism, not shown) and are pivotally rotated around the respective upper ends of the second lifter links 12B, 12D. The first lifter links 12A, 12C operate as driven links (aka subservient links) that follow the pivotal displacement of the second lifter links 12B, 12D.

The second lifter links 12B, 12D receive a rotational force (a driving force) from the second connecting rod 11B. The second connecting rod 11B rotates by receiving a rotational force from a driving device (not shown) provided to the cushion frame 9. The driving device comprises an electric motor and a deceleration mechanism comprising a plurality of gears.

2.2 Restriction Member

Figure 6:
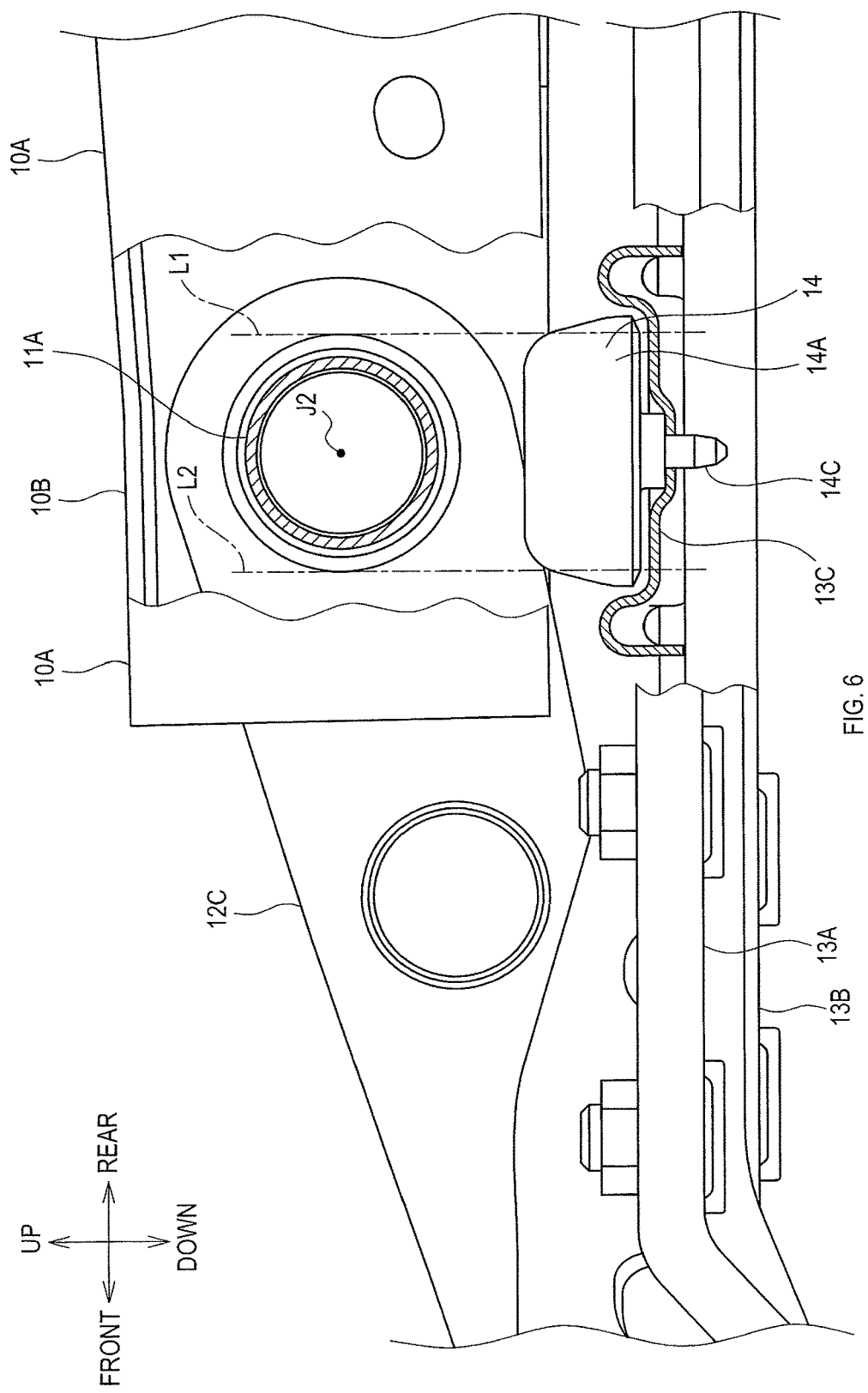
FIG. 6 is a view showing a positional relationship of a first connecting rod and a restriction member in the cushion frame according to the embodiment of the present disclosure.

As shown in FIG. 6, a restriction member 14 is a member to restrict a downward displacement of the first connecting rod 11A below a specified position. When projected on a virtual plane perpendicular to the first connecting rod 11A, the restriction member 14 is arranged to be directly under the first connecting rod 11A that is projected on the virtual plane (when the seat is in a stored state, and the lifter links are in a lying state). This arrangement is also visible in FIGS. 4 and 5. The perspective view of FIG. 5 may show this most clearly.

Herein, the virtual plane corresponds to a paper plane of FIG. 6. The description "the restriction member 14 is arranged to be directly under the first connecting rod 11A" means, for example, at least a part of the restriction member 14 is located within an area defined between two virtual vertical lines L1, L2 that circumscribe the first connecting rod 11A. In FIG. 6, all of the first connecting rod 11A is directly above first restriction member 14A (aka left restriction member 14A). Only a small forward edge and a small rearward edge of the first restriction member 14A is not directly below the first connecting rod 11A (see also FIG. 7).

As shown in FIG. 7, the restriction member 14 comprises a first restriction member 14A and a second restriction member 14B. The first restriction member 14A is mounted to a first extending end of the bridge portion 13C (a left end in the present embodiment). The second restriction member 14B is mounted to a second extending end of the bridge portion 13C (a right end in the present embodiment).

The first restriction member 14A and the second restriction member 14B are not arranged to be direct under the left side frame 10A or the right side frame 10B, but at positions allowing contact with the first connecting rod 11A direct under the first connecting rod 11A (see FIG. 7, and see the perspective view in FIG. 5).

Also, at least an upper end of the restriction member 14 comprises a deformable buffer member. In the present embodiment, rubber is employed as the buffer member, and the substantially entire restriction member 14 is formed of the rubber. The restriction member 14 comprises a screw 14C embedded therein (see FIG. 6). The restriction member 14 is fixed to the bridge portion 13C by the screw 14C. A first screw may fix the first restriction member 14A, and a second screw may fix the second restriction member 14B.

3. Features of Vehicle Seat in Present Embodiment

When the lifter links 12A to 12D pivot to lie (in a stored state), and thereby the cushion frame 9 is lowered, occurrence of a state (a) or a state (b) below may cause a defect of "failing to return the cushion frame to its initial position."

Figure 8:
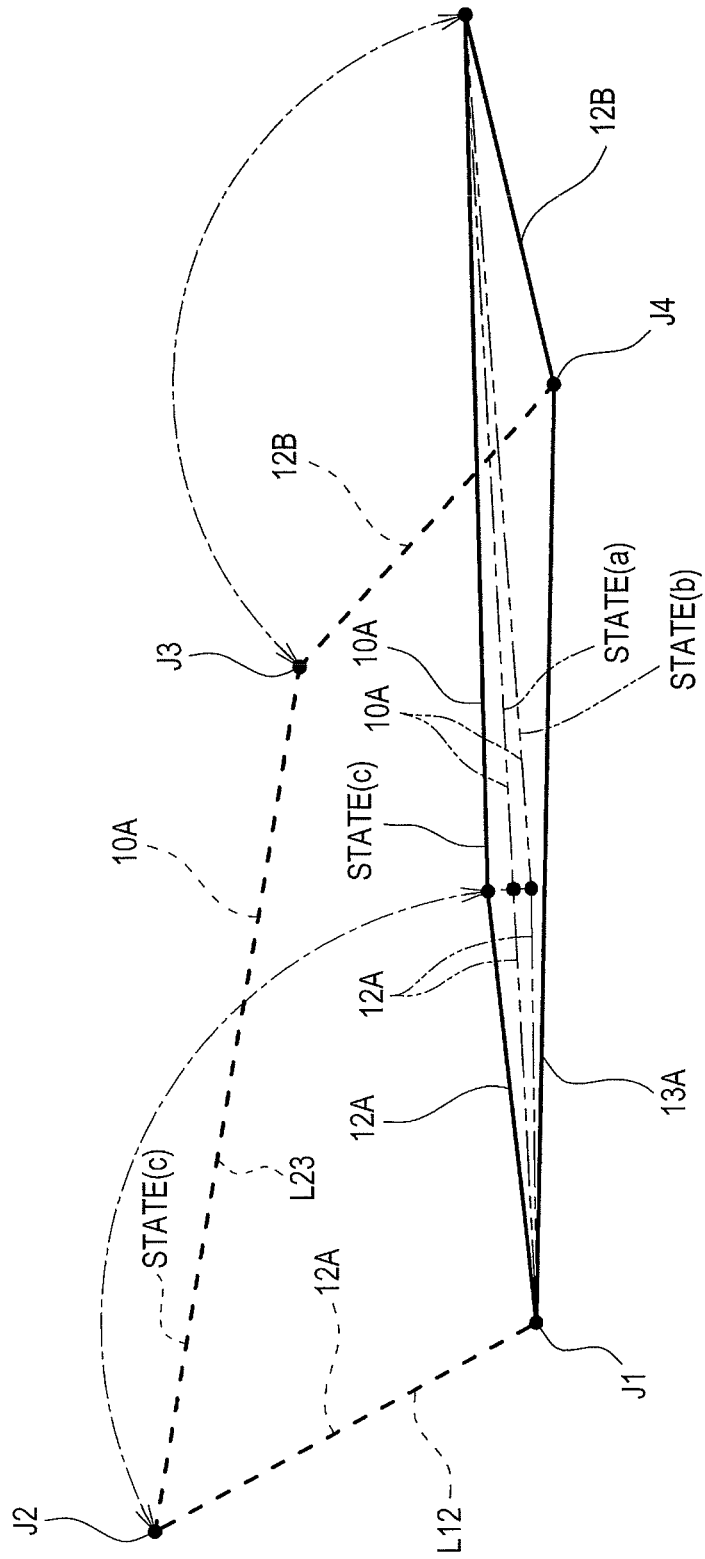
FIG. 8 is a diagram illustrating effects of the vehicle seat according to embodiment of the present disclosure.

(a) A coaxial state where the first lifter link 12A and the left side frame 10A are aligned on a coaxial line (see FIG. 8). This coaxial state was described in great detail above.

(b) A below coaxial state where a center point of coupling between the first lifter link 12A and the left side frame 10A is positioned below the aforementioned straight line.

Other states included:

(c) A normal stored state, see STATE(c) in FIG. 8, and see FIGS. 4 and 5.

(d) A seating state, see STATE(d) in FIG. 8, and see FIG. 1.

In contrast, in the present embodiment, the restriction member 14 is arranged to be direct under the first connecting rod 11A; thus, occurrence of the state (a) or the state (b) can be reduced. Accordingly, occurrence of the aforementioned defect can be reduced.

If a downward load is applied to the left side frame 10A and the right side frame 10B, the second lifter links 12B, 12D as driving links are less likely to be displaced downwardly as compared with the first lifter links 12A, 12C as driven links.

Accordingly, as described above, the restriction member 14 may be arranged to be direct under the first connecting rod 11A to which the first lifter links 12A, 12C are coupled.

Specifically, since the second lifter links 12B, 12D are driving links, pivotal movement of the second lifter links 12B, 12D requires rotation of the second connecting rod 11B, and the electric motor and the gears of the deceleration mechanism of the driving device.

Since a rotational load to rotate the electric motor and the deceleration mechanism is large, the second lifter links 12B, 12D hardly rotate even when a rotation input is provided to the second lifter links 12B, 12D. That is, the second lifter links 12B, 12D are less likely to be displaced downwardly as compared with the first lifter links 12A, 12C.

This is the reason that the restriction member 14 may be arranged to be direct under the first connecting rod 11A to which the first lifter links 12A, 12C are coupled.

The restriction member 14 is arranged in the position allowing contact with the first connecting rod 11A. In other words, if a downward load is applied to the left side frame 10A and the right side frame 10B, the restriction member 14 contacts the first connecting rod 11A, thereby restricting downward displacement of the aforementioned center point of coupling.

A configuration may also be employed in which downward displacement of the first connecting rod 11A is restricted by contact of the left side frame 10A and the right side frame 10B with the restriction member 14.

However, since the first lifter links 12A, 12C are coupled to the first connecting rod 11A, downward displacement of the first connecting rod 11A cannot be restricted directly by the configuration in which the left side frame 10A and the right side frame 10B contact the restriction member 14.

In contrast, with a configuration in which the restriction member 14 contacts the first connecting rod 11A as in the present embodiment, downward displacement of the first connecting rod 11A can be surely restricted.

Further, in the present embodiment, a gap is provided between the first connecting rod 11A and the restriction member 14 as shown in FIG. 6. The gap is intended to absorb dimensional variations of the first connecting rod 11A, the left side frame 10A, the right side frame 10B, the bridge portion 13C, and other components. That is, according to the present embodiment, the first connecting rod 11A and the restriction member 14 may be surely brought into contact with each other even with dimensional variations of components.

At least the upper end of the restriction member 14 comprises a deformable buffer member. This enables reduction in generation of a large noise when the restriction member 14 and the first connecting rod 11A contact each other.

The restriction member 14 is provided to the base 13 that is configured to fix the lower ends of the first lifter links 12A, 12C to the vehicle. Thus, at the same time that the vehicle seat 1 is mounted to the vehicle, mounting of the restriction member 14 is completed. Accordingly, an improved mounting efficiency of the restriction member 14 to the vehicle can be achieved.

Moreover, the restriction member 14 comprises the first restriction member 14A provided to the first extending end of the bridge portion 13C and the second restriction member 14B provided to the second extending end of the bridge portion 13C.

This enables a definite reduction in occurrence of the aforementioned defect within a range of dimensional variations of the left side frame 10A, the right side frame 10B, the bridge portion 13C, and other components.

Specifically, even with dimensional variations, at least one of the first restriction member 14A or the second restriction member 14B can be surely brought into contact with the first connecting rod 11A. Accordingly, occurrence of the aforementioned defect can be surely reduced.

[Other Embodiments]

In the above-described embodiment, the restriction member 14 is arranged to be direct under the first connecting rod 11A. However, the present disclosure is not limited to such configuration. For example, the restriction member 14 may be arranged to be direct under the left side frame 10A and the right side frame 10B so that downward displacement of the first connecting rod 11A will be restricted by contact of the left side frame 10A and the right side frame 10B with the restriction member 14.

In the above-described embodiment, the second lifter links 12B, 12D are coupled indirectly to the left side frame 10A and the right side frame 10B through the second connecting rod 11B. However, the present disclosure is not limited to such configuration. For example, the second lifter links 12B, 12D may be coupled directly to the left side frame 10A and the right side frame 10B and not through the second connecting rod 11B.

In the above-described embodiment, the second lifter links 12B, 12D are driving links. However, the present disclosure is not limited to such configuration. For example, the second lifter links 12B, 12D may be driven (subservient) links.

In the above-described embodiment, the restriction member 14 is arranged to be directly under the first connecting rod 11A in the normal stored state. However, the present disclosure is not limited to such configuration. For example, the restriction member 14 may be arranged to be directly under the second connecting rod 11B.

In the above-described embodiment, the first restriction member 14A and the second restriction member 14B are provided to the bridge portion 13C that forms a part of the base 13. However, the present disclosure is not limited to such configuration. For example, a configuration may be employed in which the base 13 or the bridge portion 13C is omitted, and one, or three or more restriction members are fixed to the vehicle.

In the above-described embodiment, the description has been given of an example of a rear seat in a passenger car. However, the present disclosure is not limited to such example but may be applicable to other automobile seats or seats for use in various vehicles such as railway vehicles, ships, and airplanes.

Furthermore, the present disclosure is not limited to the above-described embodiments but may be in any form that falls within the scope of the invention defined by the appended claims. Accordingly, at least two embodiments of the above-described plurality of embodiments may be combined.

What is claimed is:

1. A vehicle seat for installation in a vehicle, the vehicle seat comprising:
   a side frame extending in a seat front-rear direction and forming a part of a cushion frame;
   a rod extending in a seat-width direction and comprising one end coupled to the side frame;
   a first lifter link comprising an upper end pivotably coupled to the side frame through the rod and a lower end pivotably coupled to the vehicle;
   a second lifter link provided in a position shifted in the seat front-rear direction relative to the first lifter link, the second lifter link comprising an upper end pivotably coupled to the side frame and a lower end pivotably coupled to the vehicle; and a restriction member configured to restrict downward displacement of the rod below a specified position, the restriction member, when projected on a virtual plane perpendicular to the rod, being located substantially under the rod that is projected on the virtual plane.

2. The vehicle seat according to claim 1,
wherein the second lifter link is a driving link configured to receive a rotational force and be pivotally rotated around the upper end of the second lifter link, and
wherein the first lifter link is a driven link configured to follow a pivotal displacement of the second lifter link.

3. The vehicle seat according to claim 1, wherein the restriction member is arranged in a position allowing the restriction member to contact the rod.

4. The vehicle seat according to claim 1, wherein at least an upper end of the restriction member comprises a deformable buffer member.

5. The vehicle seat according to claim 1, further comprising:
a base configured to fix the lower end of the first lifter link to the vehicle,
wherein the restriction member is provided to the base.

6. The vehicle seat according to claim 1,
wherein the side frame and the first lifter link are provided at each side of the vehicle seat in the seat-width direction,
wherein the base comprises two base portions provided on respective sides of the vehicle seat in the seat-width direction and a bridge portion extending in the seat-width direction and coupling the two base portions, and
wherein the restriction member further comprises a first restriction member provided to a first extending end of the bridge portion and a second restriction member provided to a second extending end of the bridge portion.

7. A seat for a vehicle, the seat comprising:
a left four-bar link mechanism including:
a left base,
a front-left lifter link joined to a front end of the left base through a first joint, wherein the first joint has a first center,
a left side frame joined to an upper end of the front-left lifter link through a second joint, wherein the second joint has a second center,
a rear-left lifter link joined to a rear end of the left side frame through a third joint, wherein the third joint has a third center, wherein the rear-left lifter link is also joined to a rear end of the left base through a fourth joint, and wherein the fourth joint has a fourth center;
a right four-bar link mechanism located at a right side of the seat, and shaped substantially as a mirror image of the left four-bar link mechanism, and including:
a right base,
a front-right lifter link,
a right side frame, and
a rear-right lifter link;
a first connecting rod extending rightward from the second joint, and connecting the second joint to a corresponding joint in the right four-bar link mechanism;
a bridge portion extending rightward from the left base, and connecting the left base to the right base; and
a first restriction member located on the bridge portion.

8. The seat of claim 7,
wherein the left four-bar link mechanism and the right four-bar link mechanisms are configured to displace between a seating state and a normal stored state,
wherein the seating state includes:
the front-left lifter link leans forward, such that the second center is located above and forward of the first center, and
the rear-left lifter link leans forward, such that the third center is located above and forward of the fourth center,
wherein the normal stored state includes:
the front-left lifter link leans rearward, such that the second center is located rearward and above the first center, and
the rear-left lifter link leans rearward.

9. The seat of claim 8,
wherein the first restriction member is configured to be compressed between the first connecting rod and the bridge portion when the seat reaches a coaxial state, such that the compression pushes the first connecting rod away from the bridge portion and tends to return the seat to a normal stored state,
wherein the coaxial state occurs when a first line is coaxial with and in series with a second line,
wherein the first line connects the first center with the second center, and
wherein the second line connects the second center with the third center.

10. The seat of claim 9, wherein the first line is longer than the second line.

11. The seat of claim 10, wherein the rear-left lifter link is a driving link connected to a drive mechanism, and wherein the front-left lifter link is a driven link subservient to the driving link.

12. The seat of claim 11, wherein the first restriction member is shaped like a vertical cylinder, is located on an upper surface of the bridge portion, and includes a deformable buffer member.

13. The seat of claim 12, wherein the first restriction member is located substantially under a central portion of the first connecting rod when the seat is in a normal stored state.

14. The seat of claim 13,
wherein the first connecting rod includes:
a central portion with a large diameter,
a tapered left portion, and
a tapered right portion,
wherein the first restriction member is located under a left end of the central portion when the seat is in a normal stored state, such that the first restriction member contacts a lower surface of the left end of the central portion when the seat approaches the coaxial state.

15. The seat of claim 14, further comprising:
a second restriction member, substantially identical to the first restriction member, and located under a right end of the central portion when the seat is in a normal stored state, such that the second restriction member contacts a lower surface of the right end of the central portion when the seat approaches the coaxial state.

16. The seat of claim 15, wherein the large diameter of the first connecting rod is approximately equal to a diameter of the first restriction member.

17. The seat of claim 16, wherein the first restriction member is configured to contact the first connecting rod in the normal stored state, such that the bridge portion supports the connecting rod via the first restriction member, and such that the first restriction member damps vibrations of the seat.

18. The seat of claim 9, wherein the first restriction member is configured to contact the first connecting rod in the normal stored state, such that the bridge portion supports the connecting rod via the first restriction member, and such that the first restriction member damps vibrations of the seat in the normal stored state.

19. The vehicle seat according to claim 4, further comprising:
   a left base and a right base configured to fix the vehicle seat to the vehicle; and
   a bridge portion extending between the left base and the right base to couple the left base and the right base,
   wherein the restriction member is shaped like a vertical cylinder and is located on an upper surface of the bridge portion.

* * * * *